UNITED STATES PATENT OFFICE.

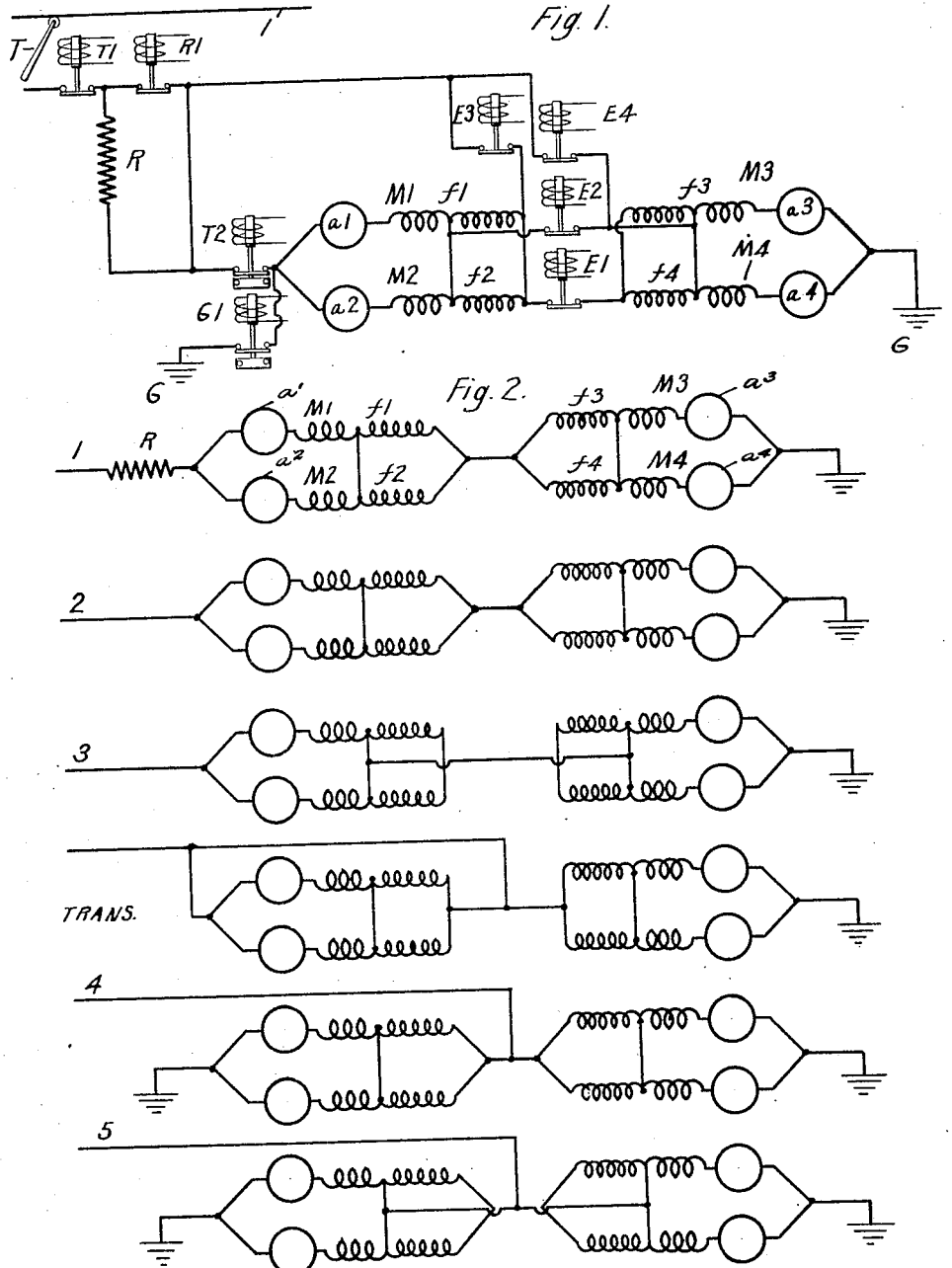

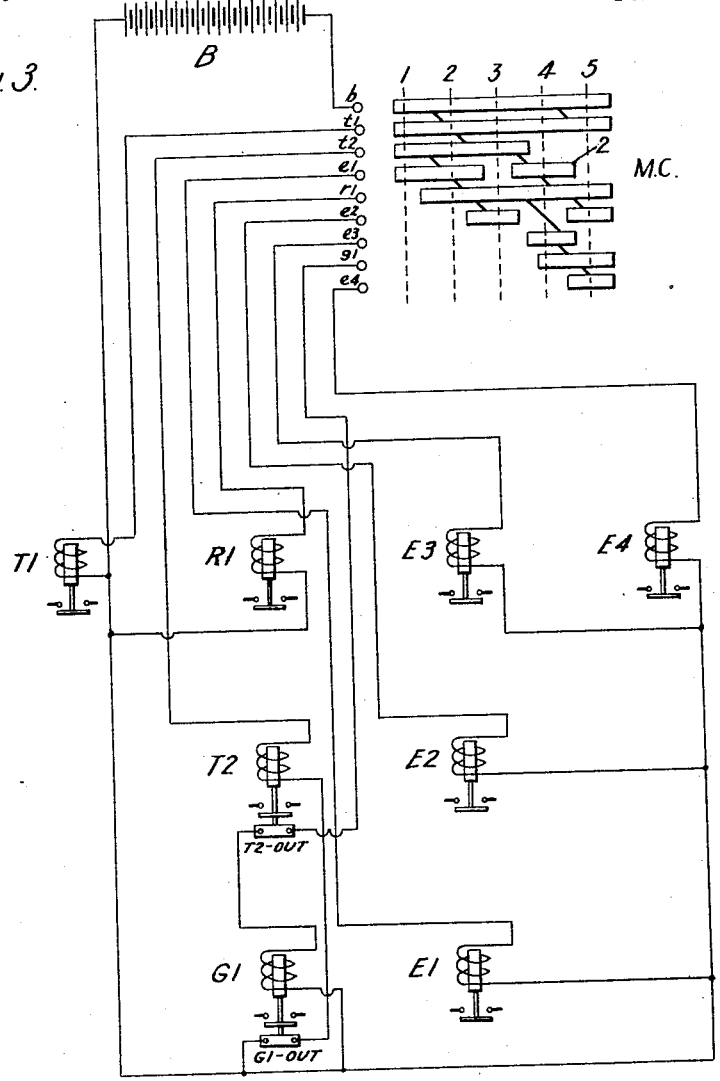

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,283,353.  Specification of Letters Patent.  Patented Oct. 29, 1918.

Application filed September 10, 1915. Serial No. 50,081.

*To all whom it may concern:*

Be it known that I, NORMAN W. STORER, a citizen of the United States, and a resident of Pittsburgh, in the county of Allegheny and State of Pennsylvania, have invented a new and useful Improvement in Control Systems, of which the following is a specification.

My invention relates to methods of, and means for, controlling dynamo-electric machines, and it has special reference to the control of a four-motor equipment adapted for the propulsion of electric railway cars or locomotives.

One of the objects of my invention is to provide an improved and simplified method of, and means for, controlling the operation of a plurality of electric railway motors or similar driving units, and particularly to make provision for governing the circuit connections of an accelerating resistor and establishing "field control" connections for the motors through the agency of a minimum number of switches.

A further object of my invention is to provide a method of, and means for, controlling the operation of four electric motors, whereby the four motors may be placed in series-parallel groups, and then in full parallel arrangement, while effecting reversals in the direction of flow of current through certain of the motors during the operation, and also securing field control by suitable adjustments of the field magnet windings.

In the past, control systems have been used in which four series wound motors were connected initially in series relation by permanent connections, with their field magnet windings adjacent, but separated by resistors, and with switches and circuit connections for establishing short-circuit connections around the resistors, and for connecting the motors in series parallel or parallel circuit relation to the trolley conductor while securing the so-called "field control". In my system, however, one resistor is placed in series with the four series wound motors which have their field magnet windings adjacently disposed and are divided into sets of two motors each with permanent connections in each set between the armature terminals, between the field magnet winding terminals and between intermediate points of the field magnet windings, whereby the system may be operated and the so-called "field control" obtained by a less number of switches than by similar control systems in the past.

My invention is illustrated in the accompanying drawings, in which Figure 1 is a diagrammatic view of the main circuit connections and main control apparatus of a system of control embodying my invention; Fig. 2 consists of simplified diagrammatic views of the main circuit connections of the motors that are established in different positions of the master controller; Fig. 3 is a diagrammatic view of the auxiliary control circuit connections and auxiliary apparatus for governing the operation of the main control apparatus; and Fig. 4 is a sequence chart indicating the positions of the various switches in the different positions of the master controller.

Referring to the drawings, the systems shown comprises a supply circuit conductor 1 that is adapted to deliver energy to a plurality of motors $M^1$, $M^2$, $M^3$ and $M^4$ through a trolley T, an accelerating resistor R, and a plurality of unit switches $T^1$, $R^1$, $T^2$, $G^1$, $E^1$, $E^2$, $E^3$ and $E^4$ for arranging the motor circuit connections for series-parallel and full parallel operation of the driving motors.

The motors $M^1$, $M^2$, $M^3$ and $M^4$, respectively comprise armatures $a^1$, $a^2$, $a^3$ and $a^4$ and field magnet windings $f^1$, $f^2$, $f^3$ and $f^4$. The motors are normally arranged to be placed in series-parallel circuit relation on the first step of the master controller.

The several unit switches referred to may be of any suitable construction, and although illustrated as electrically operated switches, they may be electro-pneumatically actuated devices of any well known type. Certain of the unit switches embody auxiliary interlock switches to prevent the establishment of short-circuit connections between the trolley conductor and ground G. For the sake of simplicity, I shall hereinafter denote the interlock switches by the reference characters used to designate the unit switches with which they are associated, together with the word "In" or "Out", which signifies the position of the unit switch when its interlock switch is closed. For example, interlock $G^1$—out indicates that the interlock switch of unit switch $G^1$ is closed in the "out" position of the unit switch.

Master controller MC, shown in Fig. 3, comprises a movable conducting segment 2 which is adapted to coöperatively engage a plurality of stationary contact members $b$, $t^1$, $t^2$, $e^1$, $r^1$, $e^2$, $e^3$, $g^1$ and $e^4$ upon the position indicating lines 1, 2, 3, 4 and 5, whereby energy is supplied from a suitable source or battery B to the energizing coils of the several unit switches.

Assuming the circuit connections and the apparatus to be as shown in the figures, the operation of the system is as follows:

The master controller MC is first moved into position 1 to establish a circuit from the source of energy B which includes terminal $b$ and contact segment 2, where the circuit divides, one branch including contact terminal $t^1$, and actuating coil of unit switch $T^1$ to the source of energy B. Another branch includes contact terminal $t^2$, operating coil of unit switch $T^2$, interlock switch $G^1$—out and the source of energy B. A third branch includes contact terminal $e^1$, coil of unit switch $E^1$ and the source of energy B. Unit switches $T^1$, $T^2$ and $E^1$ are thereby closed to connect the motors $M^1$, $M^2$, $M^3$ and $M^4$ with full field windings in series-parallel circuit relation with each other, and resistor R in series circuit between the motors and supply circuit 1. The motor-circuit connections with the master controller operated to its first position, as indicated above, are shown in step 1 of Fig. 2.

When the master controller MC is moved to its second position, an additional circuit is closed which includes contact terminal $r^1$, operating coil of the unit switch $R^1$ and the source of energy B. The coil of the unit switch $R^1$ is thus energized, thereby closing the switch $R^1$ to establish a short-circuit connection around the resistor R, and to connect the motors directly in series-parallel circuit relation to the supply circuit 1. The connections of the main circuits for this controller position are shown in step 2 of Fig. 2.

In position 3 of the master controller, an additional circuit is established which includes contact terminal $e^2$, operating coil of the unit switch $E^2$ and the source of energy B. The coil of the unit switch $E^2$ is thus energized and said switch is operated to connect together the intermediate points of the field magnet windings $f^1$, $f^2$, $f^3$ and $f^4$ and thereby to establish intermediate connections to the field magnet windings and exclude portions of these field magnet windings for increasing the speed of operation. Immediately subsequent to the engagement of terminal $e^2$ with segment 2, the circuit through the energizing coil of switch $E^1$ is interrupted by the disengagement of terminal $e^1$ and segment 2. The motor-circuit connections for this position of the master controller are illustrated in step 3 of Fig. 2.

Between the positions 3 and 4 of the master controller MC, a transition notch or step is provided by which a circuit including contact terminal $e^1$, operating coil of unit switch $E^1$, and source of energy B is closed, the circuit including operating coil of unit switch $E^2$ is broken and a circuit including contact terminal $e^3$, coil of unit switch $E^3$ and source of energy B is closed. Thus a short-circuit connection is established around motors $M^1$ and $M^2$, and motors $M^3$ and $M^4$ are connected in parallel-circuit relation to the supply circuit 1. The above circuits are illustrated in the transition step of Fig. 2 of the drawings.

In position 4 of the master controller MC, the circuit including energizing coil of switch $T^2$ is interrupted by disengagement of terminal $t^2$ and segment 2 and an additional circuit is closed through the contact terminal $g^1$, interlock $T^2$—out, operating coil of the unit switch $G^1$ and source of energy B. The switch $G^1$ therefor is energized and closed. In so doing, the circuit including the operating coil of the unit switch $T^2$ is broken at a second joint by reason of the opening of the interlock switch $G^1$—out when switch $G^1$ closed. Switch $T^2$ is thus deënergized and held open. In this manner, the motors are connected in parallel-circuit relation with full fields and reversals in the direction of the flow of current through the motors $M^1$ and $M^2$ are effected. (See step 4 of Fig. 2).

When the master controller MC is moved to the fifth and last step, two circuits are closed, one including contact terminal $e^2$, actuating coil of the unit switch $E^2$ and the source of energy B, and the other including contact terminal $e^4$, operating coil of the unit switch $E^4$ and source of energy B, while the circuits including the operating coils of unit switches $E^1$ and $E^3$ are broken. Switches $E^2$ and $E^4$ are therefore energized and closed and switches $E^1$ and $E^3$ are opened. Thus, the full parallel circuit relations of the motors is retained as in step 4, and switch $E^2$ establishes a connection to an intermediate joint of each field magnet winding to exclude portions of each of the field magnet windings $f^1$, $f^2$, $f^3$ and $f^4$, completing circuits as illustrated in step 5 of Fig. 2.

In brief, the operation of this system consists, first; in connecting four motors in series-parallel relation to each other and in series with the resistor to the supply circuit, second; in establishing a short-circuit connection around the resistor and connecting the motors in series parallel relation directly to the supply circuit, third; in excluding portions of each of the field magnet windings from the circuit, fourth; in placing the motors in full parallel-circuit relation to each other, and at the same time reversing the direction of current flow through some of the motors; and finally, in excluding portions of the field magnet windings from the circuit while the motors are in full parallel-circuit relation to each other.

The electric motors in my system are normally arranged to be connected in series parallel circuit relation, and all the field magnet windings are arranged adjacent, thus reducing the number of switches required to a minimum.

Various modifications in the circuit connections and mode of operation may be effected without departing from the spirit and scope of my invention, and I desire, therefore, that only such limitations shall be imposed as are indicated in the appended claims.

I claim as my invention:

1. In a control system, the combination with a supply circuit and a plurality of dynamo-electric machines connected in series-parallel-circuit relation across said circuit and having armature and field-magnet windings, the field-magnet windings of the dynamo-electric machines being adjacently disposed, of means for interconnecting corresponding intermediate points in all of said field-magnet windings to simultaneously exclude a portion of each field winding from the motor circuit, means for connecting the motors in full-parallel relation, with all short-circuits removed from the field windings, and means for simultaneously excluding a portion of each field winding from circuit when the motors are in full-parallel relation.

2. In a control system, the combination with a supply circuit, and a plurality of dynamo-electric machines connected in series-parallel-circuit relation across said circuit and having armatures and field-magnet windings, the field-magnet windings of all dynamo-electric machines being adjacently disposed, of means comprising one switch for interconnecting corresponding intermediate points in all of said field-magnet windings.

3. In a control system, the combination with four series-wound motors having armature and field-magnet windings and divided into sets of two motors each with permanent connections between the armature terminals, between the field-magnet-winding terminals and between intermediate points of each field-magnet winding of each set, of means for connecting the two sets of motors in series-parallel-circuit relation, with full-field-magnet windings, means comprising a single switch for excluding a portion of each of the field-magnet windings from circuit, and means for connecting the motors in parallel-circuit relation, with full-field-magnet windings and with portions of the field-magnet windings excluded from circuit.

4. In a control system, the combination with a supply circuit, and a plurality of motors initially connected in series-parallel circuit relation across said circuit and having armature and field magnet windings, the field magnet windings of all motors being adjacently disposed, of means for connecting the motors in parallel-circuit relation and means comprising a single switch for establishing a common connection to intermediate points of all the field magnet windings to simultaneously exclude a portion of the field magnet windings of each motor when the motors are in series-parallel circuit relation and when the motors are in parallel circuit relation.

5. In a control system, the combination with a supply circuit, and a plurality of motors initially connected in series-parallel circuit relation across said circuit and having armature and field magnet windings, the field magnet windings of all motors being adjacently disposed, of means for placing the motors in parallel-circuit relation and for reversing the direction of flow of the current through a portion of the motors, and means to establish a common connection to intermediate points of all field magnet windings, to exclude a portion of the field magnet windings of each motor when the motors are in series-parallel circuit relation and when the motors are in full-parallel circuit relation.

6. In a control system, the combination with four series wound motors having armature and field magnet windings and arranged in sets of two motors and each set having permanent connections between the armature terminals, between the field magnet winding terminals and between intermediate points of the field magnet windings, of three interconnecting circuits, each including a switch and connecting together like permanent connections in the two motor sets, and three power circuits each including a switch and connected to the said three interconnecting circuits.

7. In a control system, the combination with four series wound motors having armature and field magnet windings and arranged in sets of two motors and each set having permanent connections between the armature terminals, between the field magnet winding terminals and between intermediate points of the field magnet windings, of a ground circuit to the armature terminals of each set and one of which includes a switch, two circuits each including a switch, to connect similar permanent connections between the field magnet windings of the two sets, and three power circuits each including a switch and connected respectively to the armature terminals of one set, to the field magnet winding terminals of one set and to the intermediate points of the field magnet windings of one set.

8. The method of controlling four series electric motors arranged in sets of two motors and each set having a permanent connection between the armature terminals, between the field magnet winding terminals, and between intermediate points of the field magnet windings, which consists in connecting the motors in series-parallel circuit relation, in simultaneously excluding portions of the field magnet windings while the motors are in series-parallel circuit relation, in removing all short circuits from the field windings and connecting the motors in parallel circuit relation with full field magnet windings and in simultaneously excluding portions of the field magnet windings while the motors are in parallel circuit relation.

9. The method of controlling four electric motors initially connected in series parallel circuit relation and having their field magnet windings adjacently disposed, which consists in establishing a common connection to intermediate points of all field magnet windings excluding portions of each of the field magnet windings from the circuit, in connecting the motors in parallel circuit relation and breaking the connection to intermediate points of the field magnet windings, and finally in establishing a connection to intermediate points of each field magnet winding connection to simultaneously exclude portions of each of the field magnet windings from the circuit while the motors are connected in parallel circuit relation.

10. The method of controlling four electric motors initially connected in series-parallel circuit relation and having their field magnet windings adjacently disposed, and a resistor in series with the four motors which consists first, in establishing a short-circuit connection around the resistor, second, in establishing a common connection to intermediate points of all field magnet windings excluding portions of the field magnet windings from the circuit, third, in connecting the motors in parallel circuit relation and reversing the direction of the current flow through two of the motors and breaking the common connection to intermediate points of the field magnet windings, and fourth, in excluding portions of the field magnet windings from the circuit while the motors are in parallel circuit relation.

11. In a system of control, the combination with a supply circuit, and a plurality of motors initially connected in series-parallel-circuit relation across said supply circuit and having armatures and field-magnet windings, the field-magnet windings of all motors being adjacently disposed, of means for connecting the motors in parallel-circuit relation and means comprising a single switch for establishing a common connection to intermediate points of all the field-magnet windings to simultaneously exclude a portion of the field-magnet windings of each motor when the motors are connected in series-parallel-circuit relation and when the motors are connected in parallel-circuit relation.

In testimony whereof, I have hereunto subscribed my name this 27th day of Aug. 1915.

NORMAN W. STORER.

Copies of this patent may be obtained for five cents each, by addressing the "Commissioner of Patents, Washington, D. C."